S. W. CHICK.
STREET CAR INDICATOR.
APPLICATION FILED OCT. 23, 1909.
981,167.
Patented Jan. 10, 1911.
2 SHEETS—SHEET 1.
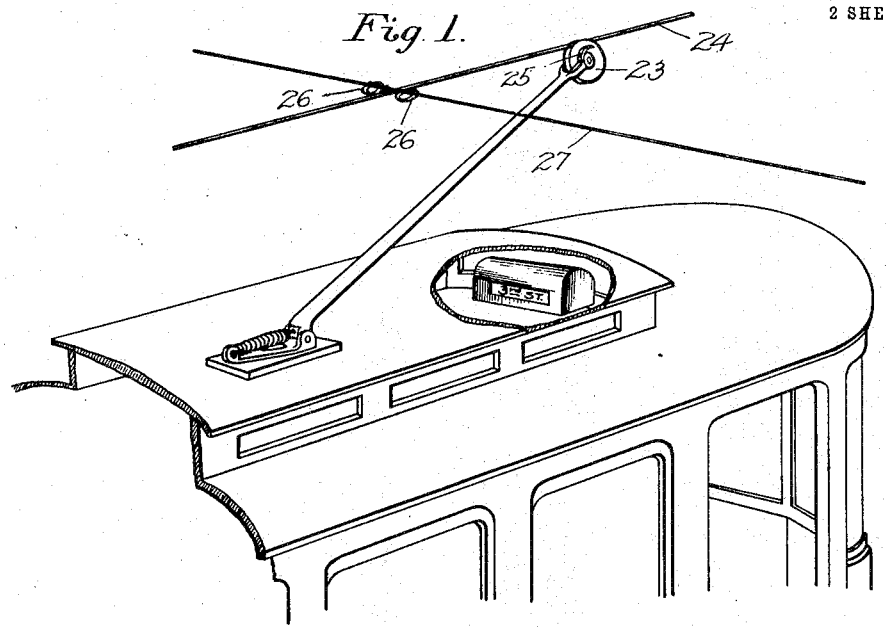
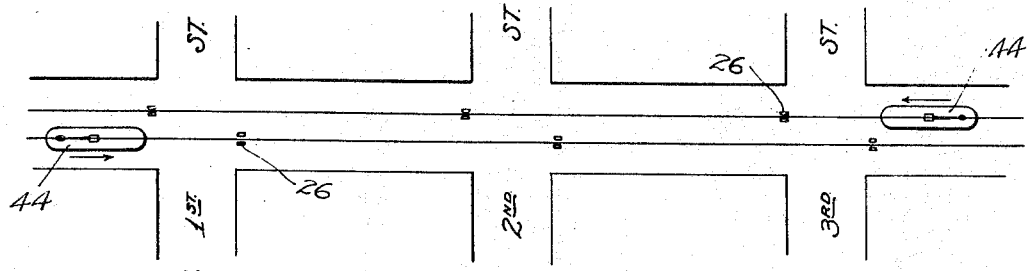
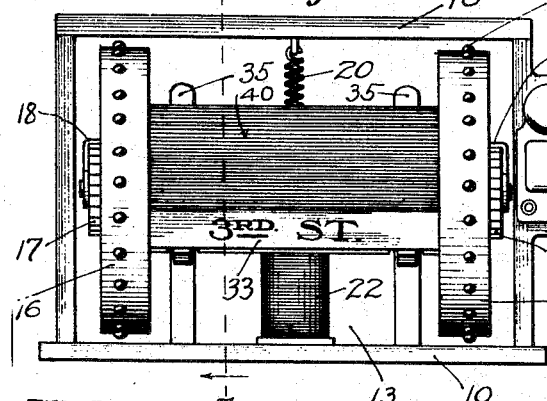
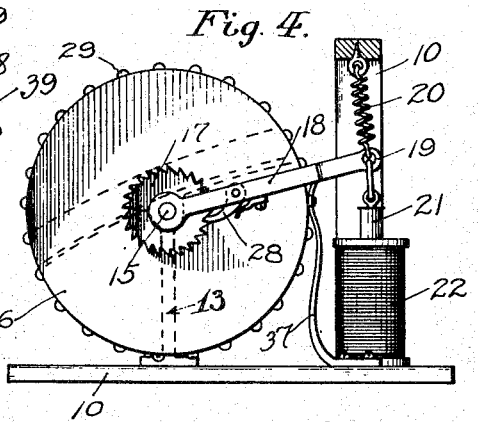
Witnesses
E. R. Pollard
C. Coleman
Inventor
Stephen W. Chick
by Hazard & Krause
Attorneys.

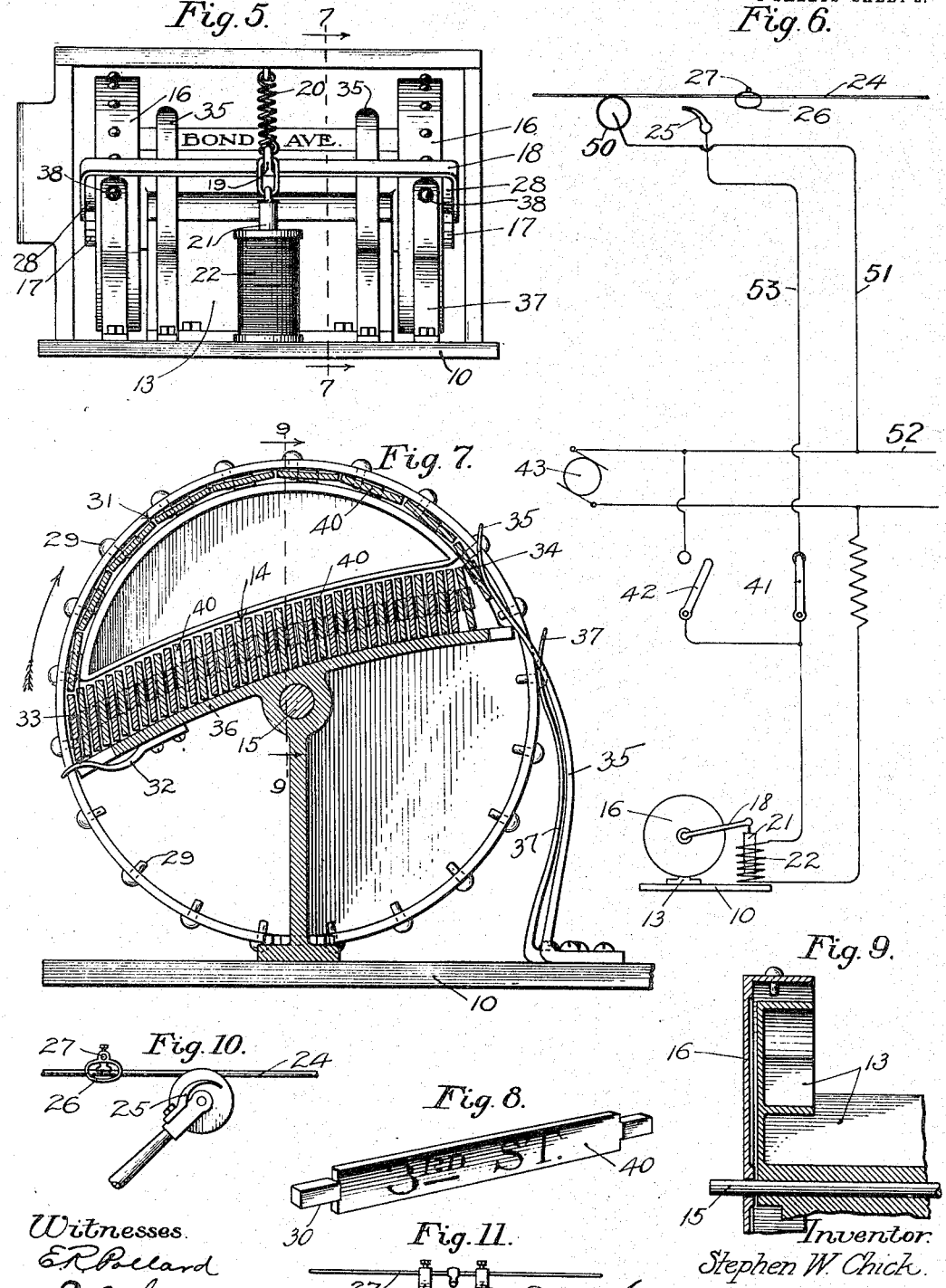

UNITED STATES PATENT OFFICE.

STEPHEN W. CHICK, OF LOS ANGELES, CALIFORNIA.

STREET-CAR INDICATOR.

981,167. Specification of Letters Patent. Patented Jan. 10, 1911.

Application filed October 23, 1909. Serial No. 524,150.

*To all whom it may concern:*

Be it known that I, STEPHEN W. CHICK, a citizen of Austria-Hungary, residing at Los Angeles, in the county of Los Angeles and State of California, have invented new and useful Improvements in Street-Car Indicators, of which the following is a specification.

My invention relates to devices for indicating in a railway car the streets or stations at proper intervals during its travel on the road, and is embodied in mechanism for operating an apparatus of this character in an automatic manner by means of the electric current.

The object of my invention is to provide an automatic indicating apparatus for use on electrically propelled cars to be operated by the same force or power which is supplied to the motors of the cars, to give an alarm and to indicate the approach of streets or stations and yet under complete control of the conductor or motorman as regards its adjustment.

To such ends and objects my invention embraces certain novel parts and construction of parts producing an improved indicator whereby the indicator actuating mechanism operated by electricity, automatically indicates the next street or station to which the car is approaching, as hereinafter described.

In the accompanying drawings: Figure 1— is a fragmentary view of a car body, showing the indicator in position and the contact points on the trolley wheel and supporting wire. Fig. 2— is a diagram of streets over which the car passes showing the location of the contact points in relation to the cross-streets. Fig. 3— is a front elevation of the indicator with the case removed. Fig. 4— is a side elevation of the indicator. Fig. 5— is a rear elevation thereof. Fig. 6— is a diagram of the operating and controlling circuits and switches. Fig. 7— is a vertical section taken on line 7—7 of Figs. 3 and 5. Fig. 8— is a perspective view of a street indicating plate. Fig. 9— is a vertical section taken on line 9—9 of Fig. 7. Fig. 10— is a side view of the trolley wire and wheel, showing the switch mechanism for closing the circuit. Fig. 11— is a view showing the trips in place on supporting cross wire.

Mounted on the frame 10 is the casting 13 which also forms the floor of the magazine 14 shown in section in Fig. 7, and also forms a bearing for the shaft 15 upon which are rotatively mounted the flanged disks 16. Rigidly attached to the flanged disks and rotatively mounted on the shaft 15 are the ratchet wheels 17. Rotatively attached to the shaft and outside of the ratchet wheels is the ratchet arm 18. This arm is attached at its outer end 19 to a spring 20 and core 21 of solenoid 22.

As the trolley wheel 23 moves along the feed wire 24, the fingers 25 contact with the trips 26, rigidly attached to the supporting wire 27, and electrically connected to the feed wire 24, thereby completing a circuit through switch 41, magnetizing the solenoid 22 and causing the core 21 to descend, the spring 20 permitting the same. As the core 21 descends, the ratchet arm (being attached thereto) rotates on the shaft 15 and causes the dog 28 to engage in a tooth of the ratchet wheel 17, thereby rotating the flanged wheel 16. As the finger 25 passing the trip 26 breaks the circuit on which the solenoid 22 is connected, the spring 20 will elevate the ratchet arm to its original position. This will cause the flanged wheels to rotate the required distance and at the proper time. Rigidly affixed to the flange of the flanged wheel, and properly spaced thereon are the lifting pins 29, plainly seen in Fig. 7. As the flanged wheel rotates in the direction indicated by the arrow (see Fig. 7) the pins catch under the tongues 30 (Fig. 8) of one of the plates 40 and lift it into the channel 31. The spring 32 will hold each plate in the proper position for the pins to engage the tongues of each approaching plate. As each plate is moved into the position 34 the spring 35 will place it properly upon the floor 36 of the magazine and aid gravity in sliding them along the floor to the position of plate 33. The floor is so inclined that the weight of the plates will move them downwardly to the bottom end of the floor into the position of the plate 33. When in this position the plates will be exposed in the car, indicating the proper cross-street. Each pin 29 carries upon its head a button or lug adapted to engage the brake spring 37, an aperture 38 being provided in the free end of the brake spring therefor. This will hold the flanged wheel in the proper position until the ratchet arm is moved by the solenoid.

Rigidly attached to the frame is an alarm bell 39, and as the ratchet arm descends it closes contacts (not illustrated) of the electric bell 39 in a shunt circuit (not illustrated) off the solenoid circuit, and this rings the bell whenever the street indicating plate is changed.

The plates 40 Fig. 8, are lettered on each side which does away with reversing the mechanism. The street names on one side indicate the streets in successive order as the car travels in one direction while the reverse side indicates the names of the streets in the opposite direction of travel. This is readily seen by the position the plates take while they slide along the channel 31. It may be desired to back the car and to protect the indicator from deranging the plates with reference to streets, this is provided by opening switch 41 (Fig. 6), thereby preventing the current from energizing the solenoid 22. In case it should be necessary to operate the indicator at any time, switch 41 must be open and switch 42 closed, thereby getting connection through the motor 43 and the indicator may be set at any desired street.

In Fig. 6, 50 represents a trolley wheel which leads the current to the motor circuit 52. A wire 53 extends down the trolley pole and connects at its upper end with the contacts 25, and in this wire the switch 41 is placed for controlling the solenoid coil 22. I provide two contacts 25, so as to reduce the wear and also the shock when the contacts strike each other.

By the diagram, Fig. 2, the relative position of the trip 26 is plainly shown, as the trolley on car 44 passes the trip 26 the mechanism of the indicator is set in operation and the name of the next street is shown on the indicator.

Having described my invention what I claim as new and desire to secure by Letters Patent is:

1. In a station indicator for electric street cars, a frame provided with an incline, a shaft rigidly mounted on said frame, a pair of flanged disks loosely mounted on said shaft, a plurality of display plates having their lower edges resting on said incline and forming a compact row on said incline, means secured to the flanged disks to transport the display plates from the front to the rear of the indicator on an actuation thereof, a ratchet mechanism for operating the flanged disks, the foremost of said plates in said magazine being displayed to view and means to operate the ratchet mechanism.

2. In a station indicator for electric street cars, a frame provided with an inclined table, a shaft rigidly mounted on said frame, a plurality of display plates on said inclined table, a pair of flanged disks loosely mounted on said shaft, a plurality of plate engaging pins secured to the flanges of said disks, said pins adapted to engage the foremost displayed plate on an actuation of the disks, a pair of plate supports secured to said frame and forming with the flanges of said disks plate guide ways, a ratchet mechanism for operating the flanged disks, and electric means to operate said ratchet mechanism.

In witness that I claim the foregoing I have hereunto subscribed my name this 14th day of October, 1909.

S. W. CHICK.

Witnesses:
EDMUND A. STRAUSE,
ETHEL COLEMAN.